United States Patent [19]

Okajima et al.

[11] 4,118,714
[45] Oct. 3, 1978

[54] LIGHT METERING SYSTEM FOR A PHOTOGRAPHIC CAMERA

[75] Inventors: Hidekazu Okajima; Hideto Iwama, both of Kawasaki, Japan

[73] Assignee: Canon Kabushiki Kaisha, Tokyo, Japan

[21] Appl. No.: 763,078

[22] Filed: Jan. 27, 1977

Related U.S. Application Data

[63] Continuation of Ser. No. 596,291, Jul. 16, 1975, abandoned.

[30] Foreign Application Priority Data

Jul. 18, 1974 [JP] Japan .................... 49/82980

[51] Int. Cl.$^2$ ............................................. G03B 7/08
[52] U.S. Cl. ................................. 354/31; 354/23 R; 354/59; 352/141
[58] Field of Search ............... 354/23, 31, 43, 59, 354/60 R; 352/141

[56] References Cited

U.S. PATENT DOCUMENTS

| Re. 26,632 | 7/1969 | Norwood | 354/59 |
|---|---|---|---|
| 3,232,192 | 2/1966 | Stimson | 354/31 |
| 3,636,839 | 1/1972 | Yamamoto | 354/31 |
| 3,683,766 | 8/1972 | Nobusawa | 354/31 |
| 3,731,604 | 5/1973 | Fujii et al. | 354/31 |
| 3,775,001 | 11/1973 | Miyakawa | 352/141 |

FOREIGN PATENT DOCUMENTS

44-2,013  3/1965  Japan .................... 354/59

Primary Examiner—Russell E. Adams
Attorney, Agent, or Firm—Toren, McGeady and Stanger

[57] ABSTRACT

A light metering system for a photographic camera which may be selectively operated in a through-the-lens (TTL) light metering mode or an outside-the-lens (OTL) light metering mode to improve the exposure control accuracy over an extended range of light levels particularly towards the low light level side. In one embodiment, the light metering system employs a single light value sensing element in combination with light path changeover means arranged upon movement to change over the light metering aspect between the TTL and OTL light metering modes. In another embodiment, there is provided two light value sensing elements of different light response characteristics from each other for adaptation to the respective light metering modes in combination with a circuit transfer switch operable to select either the TTL light metering mode or the OTL light metering mode. With a camera equipped with a shutter preselection automatic exposure control range and a diaphragm preselection automatic exposure control range, it is possible to realize suitable combinations of the exposure control modes with the light metering modes.

45 Claims, 13 Drawing Figures

LIGHT METERING SYSTEM FOR A PHOTOGRAPHIC CAMERA

This is a continuation of application Ser. No. 596,291 filed July 16, 1975 now abandoned.

BACKGROUND OF THE INVENTION

1. Field of the Invention

This invention relates to photographic cameras, and more particularly to a light metering system which provides either of a through-the-lens light metering mode and an outside-the-lens light metering mode.

2. Description of the Prior Art

The through-the-lens (TTL) light metering aspect of a photographic camera is of importance in the point of determining the correct exposure, as the light value sensing element is arranged to receive light passing through the objective lens of the camera, thereby the angular field picked up by the lens and the light-permeability of the lens can be taken into account to perform the light metering with high accuracy over the entire area of the view field. However, in many dark rooms and at night photography applications, the decreased amount of light impinging upon the light value sensing element by the objective lens and half-mirror makes it more difficult to perform the light metering and accordingly exposure control with high accuracy particularly when the light level falls outside the linear dynamic range of the light value sensing element. The camera with TTL light metering has a drawback of limiting the exposure control accuracy to a considerable extent in the low light level exposure range.

In order to eliminate such a drawback, it has been realized in some of cine cameras to combine the TTL light metering system with an outside-the-lens (OTL) light metering system where an additional light value sensing element is employed as arranged to receive light coming from an object being photographed directly without passing through the objective lens. For example, in making exposures for objects in dark rooms or at night, the light value sensing element adapted for use in the OTL light metering mode and which is normally shielded from the light as movably mounted in the camera housing is brought out therefrom. With such an OTL light metering system, however, the angular field actually picked up by the objective lens is not inherently taken into account in determining the exposure value. Since the fidelity of the OTL light metering system is very low, its use is limited to particular photography applications such as with bulb exposure (indefinite timed exposure).

SUMMARY OF THE INVENTION

With the above in mind, the present invention has for the general object to provide a novel light metering system for a photographic camera which has overcome all of the above mentioned drawbacks of the conventional light metering systems and which is adapted to remarkably improve the light metering accuracy in an extended light level range particularly toward low light levels.

An object of the present invention is to provide a light metering system constructed from a TTL light metering system associated with the objective lens system of the camera and an OTL light metering system associated with a supplementary optical system outside the objective lens system in combination with changeover means operable to select either the TTL light metering mode or the OTL light metering mode, thereby assisting the camera in making exposures over a largely extended light level range with remarkably improved accuracy as compared with the prior art.

To achieve this, according to a preferred embodiment of the present invention, a common light value sensing element is employed for both of the TTL and OTL light metering system as arranged at a suitable location within the camera housing, in combination with light path changeover means operable to transfer the light arrangement between the objective lens system and the supplementary optical system, thereby it being made possible to selectively operate the camera in the TTL light metering mode or the OTL light metering mode.

According to another preferred embodiment of the present invention, the TTL and OTL light metering systems are provided with respective light value sensing elements arranged at respective suitable locations within the camera housing, thereby it being made possible by suitable selection of these two light value sensing elements to selectively operate the camera in the TTL light metering mode or the OTL light metering mode.

According to still another preferred embodiment of the present invention, a camara having the TTL light metering system is equipped with an attachment unit having the OTL light metering system in the form of a separate member from the camera body, so that upon attachment of the attachment unit to the camera body, the light metering aspect of the camera is automatically changed over between the TTL and OTL light metering mode.

Another object of the present invention is to provide a light metering system for a photographic camera equipped with a shutter preselection automatic exposure control range and with a diaphragm preselection automatic exposure control range, which system permits selection of suitable combinations of these two exposure control modes with the TTL and OTL light metering modes, for the purpose of facilitating the extending of the reliably exposure control range and the broadening of photographic capabilities.

In connection with this object, according to a preferred embodiment of the invention, the TTL light metering mode is combined with the shutter preselection automatic exposure control mode, while the OTL light metering mode is combined with the diaphragm preselection automatic exposure control mode.

Other objects and features of the present invention will become more apparent from the following detailed description taken in conjunction with the accompanying drawings in which:

BRIEF DESCRIPTION OF THE DRAWINGS

FIGS. 1 through 7 are schematic sectional views showing various examples of the embodiments of a light metering system with the essential components thereof according to the present invention as applied to a motion picture camera.

FIGS. 8, 9 and 10 are circuit diagrams of exposure control systems suitable for use in the motion picture cameras provided with the light metering systems of FIGS. 1 through 7.

FIGS. 11, 12 and 13 are block diagrams showing switching arrangements between the light metering system and the exposure control system for selecting suitable combinations of the exposure control modes with the light metering modes.

DETAILED DESCRIPTION OF THE PREFERRED EMBODIMENTS

Figure 1:
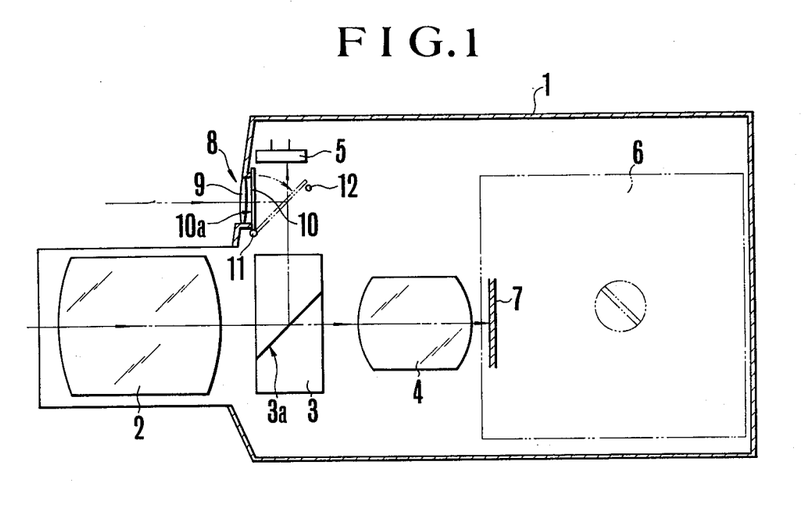
FIG. 1 shows a first example of one embodiment wherein a common light value sensing element is employed for the TTL and OTL light metering systems to selectively operate the camera in the TTL or OTL light metering mode.

Various examples of the embodiments of the present invention will neat be described in detail with reference to the drawings, and first FIG. 1. In FIG. 1, there is shown the essential components of a light metering system according to one embodiment of the present invention as applied to a motion picture camera wherein the TTL and OTL light metering systems have a single common light value sensing element 5. There is also schematically shown the motion picture camera as having a housing 1 and an objective lens comprising a front lens assembly 2 and a rear lens assembly 4 between which is positioned a beam splitter 3 having a half-mirrored surface 3a disposed to make an angle of about 90° with respect to the optical axis of the objective lens 2 and 4. The front lens assembly 2 and beam splitter 3 constitute an optical system for the TTL light metering system. Light passing through the half-mirrored surface 3a is directed through the rear lens assembly 4 and a film gate of a film cassette 6 onto a film 7 contained therein. The light metering system for the camera includes a single photoconductive element 5 such as a cadmium sulfide cell or cadmium selenide cell serving as a ligth value sensing means and arranged at a suitable location within the camera housing 1 to pick up that fraction of the light entering through the front lens assembly 2 which is split off by the beam splitter 3. An optical system for the OTL light metering system comprises a light-collecting lens 9 fitted in a window 8 provided through the front wall of the housing 1, with the optical axis of lens 9 being disposed in parallel with the optical axis of objective lens 2, and 4. In order to change over the light arrangement between the TTL and OTL light metering optical systems, there is provided a tiltable mirror 10 having a total reflection surface 10a and arranged behind the window 8 to be pivotal about a pivot shaft 11 between a standing position where the light coming through the OTL light metering optical system 9 is blocked while the light coming through the TTL light metering optical system 2 and 3 is permitted to reach the light value sensing element 5, and an inclined position where the mirror 10 is disposed as abutting on a stopper pin 12 to make an angle of about 90° with respect to the optical axis of lens 9 so that the light coming through the OTL light metering lens 9 is reflected from the total reflection surface 10a to the light value sensing element 5, while the light coming through the TTL light metering optical system is blocked by the mirror 10. This light arrangement changeover mirror 10 is provided with a manually operating member not shown which is accessible from the outside of the camera housing, thereby it being made possible to selectively operate the camera in the TTL light metering mode or the OTL light metering mode.

Figure 2:
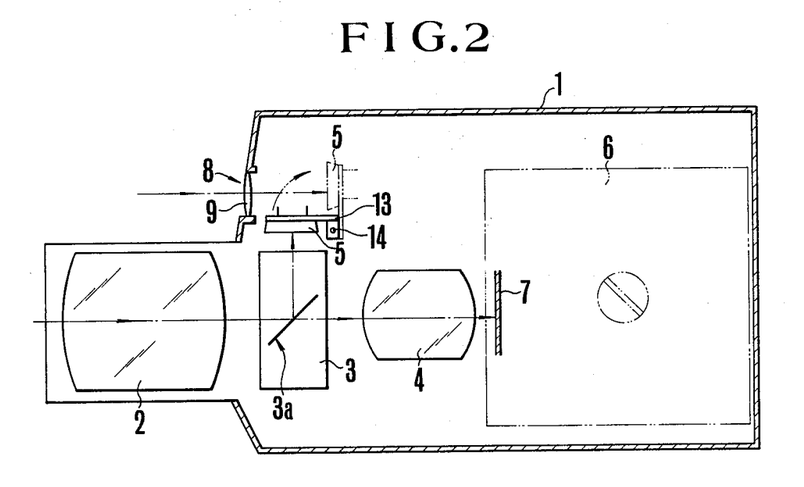
FIG. 2 shows a second example of the embodiment.

In FIG. 2, there is shown the essential components of the second example of the embodiment wherein the TTL and OTL light metering systems have a single common light value sensing element as being similar to that shown in FIG. 1 but different therefrom in that the element 5 is arranged to be movable as the light metering aspect of the camera is changed over between the TTL and OTL light metering modes, and wherein the same reference numerals have been employed to denote the similar and like parts to those shown in FIG. 1. The element 5 is fixedly mounted on a support plate 13 pivotal at a shaft 14 and movable between a position illustrated by solid lines where the light receiving surface of element 5 is disposed to pick up at least a fraction of the light coming through the TTL light metering optical system 2 and 3 but not to pick up the light coming through the OTL light metering lens 9, and a position illustrated by phantom lines where the light receiving surface of element 5 is disposed to pick up the light coming through the OTL light metering lens 9 but not to pick up any fraction of the light coming through the TTL light metering optical system. The pivoting movement of the element supporting plate 13 is controlled by a manually operating member not shown which is accessible from the outside of the camera housing, thereby it being made possible to selectively operate the camera in the TTL light metering mode or the OTL light metering mode.

Figure 3:
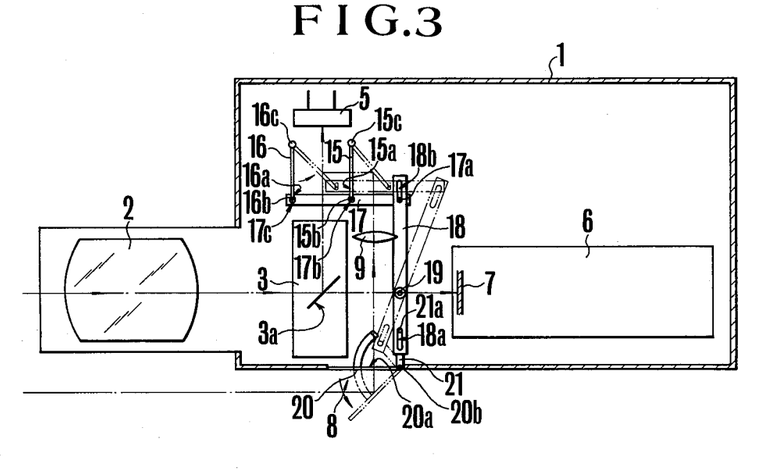
FIG. 3 shows a third example of the embodiment.

In FIG. 3 is a horizontal sectional view showing the third example of the embodiment, wherein whilst the light value sensing element arrangement is somewhat similar to that of FIG. 1, the OTL light metering optical system associated with a light arrangement changeover mechanism is largely modified from that of FIG. 1. The OTL light metering optical system comprises a pair of parallel total reflection mirrors 15 and 16 pivoted at respective shafts 15c and 16c, a convex lens 9 and a mirror 20 having a total reflection surface 20a. The mirror 20 is pivoted at a shaft 20b and its support member serves as a cover for the light-entering window 8 when the TTL light metering system is rendered operative. When the window 8 is opened by turning the mirror 20 in a counter-clockwise direction about the pivot shaft 20b from the position illustrated by solid lines to the position illustrated by the phantom lines, the pivoting movement of mirror 20 is transmitted to a lever 18 pivoted at a pin 19 through a connection of a slot 18a with a pin 21a mounted on the lever 21 at one end thereof, the opposite end of which is fixedly secured to the support member of mirror 20, thereby the lever 18 is turned in a clockwise direction about the pivot pin 19 from the position illustrated by the solid lines to the position illustrated by the phantom lines, causing a link 17 to move to the position illustrated by the phantom lines through a pin 17a-and-slot 18b connection while turning the mirrors 15 and 16 about the pins 15c and 16c to their respective positions illustrated by the phantom lines through their respective pins 15b, 16b-and-slots 17b, 17c connections. Thus, an OTL light metering optical system is established in which a light beam coming from an object being photographed in parallel to the optical axis of the objective lens is reflected from the total reflection surface 20a of mirror 20 to the convex lens 9, and therefrom is directed to the light value sensing element 5 after successive reflections from the total reflection surfaces 15a and 16a of mirrors 15 and 16. At the same time, the light path from the beam splitter 3 to the light value sensing element 5 is blocked by the mirror 16 set in the position illustrated by the phantom lines. As a result, the camera is operated in the OTL light metering mode.

When the window 8 is closed by turning the mirror 20 clockwise to the position illustrated by the solid lines, the mirrors 15 and 16 are returned to the position illustrated by the solid lines through the intermediary including the levers 21 and 18 and link 17, permitting the light value sensing element 5 to pick up at least a fraction of the light coming through the TTL light metering optical system.

Figure 4:
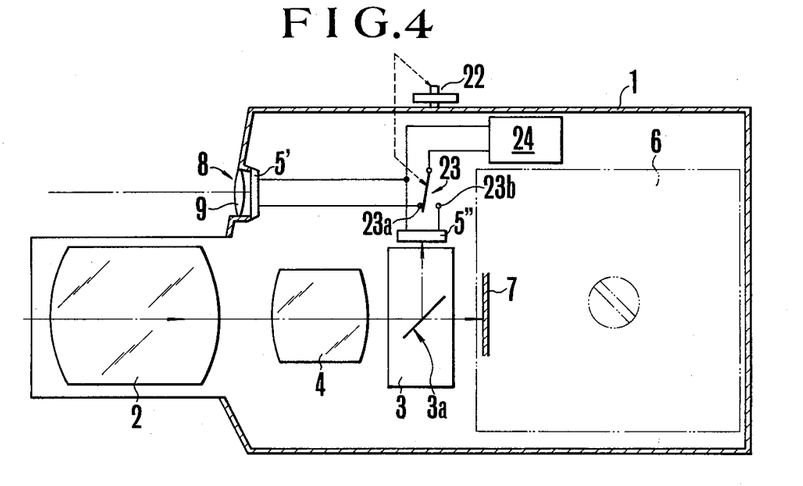
FIG. 4 shows a first example of another embodiment where the TTL and OTL light metering systems are provided with respective light value sensing elements connected to each other through a circuit transfer switch operable to select either the TTL light metering mode or the OTL light metering mode.

FIG. 4 is a vertical sectional view of the first example of another embodiment wherein there is provided first and second light value sensing elements 5' and 5" in combination of a circuit transfer switch 23 operable to connect either the first element 5" or the second element 5" to a circuit 24 for processing the output of the first or second element connected thereto. The first element 5' is arranged to pick up the light coming through an OTL light metering optical system or lens 9 fitted in a light-entering window 8 provided through the front wall of the camera housing 1. The second element 5" is arranged to pick up at least a fraction of the light coming through a TTL light metering optical system comprising front and rear lens assemblies 2 and 4 and a beam splitter 3 positioned behind the rear lens assembly 4. The switch 23 is connected to a control knob 22 provided on the camera housing through a mechanical linkage schematically indicated by dashed lines. When switch 23 is set to its "23a" or "23b" position by manipulation of the control knob 22, the camera is operated in an OTL or TTL light metering mode respectively. It is preferred to select a light value sensing element of which the light response characteristics are sufficiently effective particularly in a low light level range relative to the normal light level range for which the second element 5" is effective for employment as the first element 5'.

Figure 5:
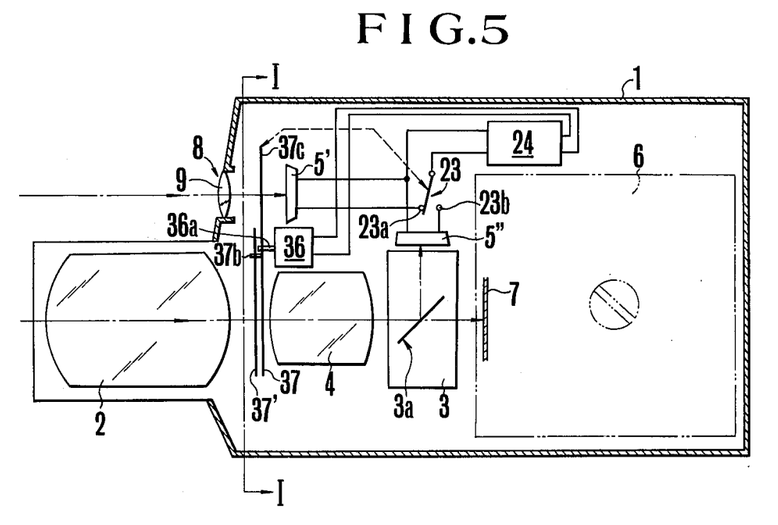
FIG. 5 shows a second example of the embodiment.
Figure 6:
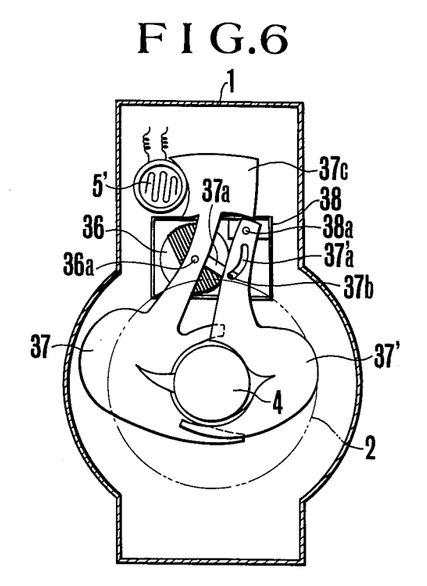
FIG. 6 is a sectional view taken along a line I—I of FIG. 5.

FIGS. 5 and 6 show an example of modification of the light metering system of FIG. 4, wherein the light metering mode changeover switch 23 of FIG. 4 is operated in automatic response to an attainment of the size of the lens aperture opening of a diaphragm device to a predetermined level. As shown in FIGS. 5 and 6, the diaphragm device comprises first and second diaphragm blades 37 and 37' arranged to cooperate with each other through a connection of a cam slot 37a' provided through the second blade 27 with a pin 37b mounted on the end portion of an arm 37a extending from the first blade 37. The first blade 37 is fixedly mounted on an output shaft 36a of an exposure meter responsive to the output of the light metering circuit 24, while the second blade 37' is movably mounted on a shaft 38a affixed to the housing 38 of meter 36. The size of the lens aperture opening defined by these two diaphragm blades 37 and 37' is controlled by meter 36 in accordance with the light value as sensed by either element 5' or element 5".

The first diaphragm blade 37 is provided with a light path restricting member 37c formed therein and arranged to be movable in front of the first light value sensing element 5' so that when the size of the aperture opening defined by blades 37 and 37' reaches the maximum, the member 37c is completely retracted from the light path for the element 5'. The diaphragm device is operatively connected to the switch 23 so that just before the size of the aperture opening reaches the maximum, in other words, at a boundary between the normal and low light level ranges, the switch 23 is changed over by one of the blades 37 and 37' from its "23b" position to its "23a" position, thereby the light metering aspect of the camera is changed over from the TTL light metering mode to the OTL light metering mode. The operative connection between the switch 23 and the diaphragm device is schematically indicated by dashed lines in FIG. 5.

With the light metering system of FIGS. 5 and 6, when the level of brightness of an object being photographed is not so much low, in other words, when the size of the aperture opening is smaller than a predetermined level, the switch 23 is set in its "23b" position where the second element 5" is connected to the light metering circuit 24 to operate the camera in the TTL light metering mode. As the object brightness level is decreased with increase in the size of the aperture opening, the effective area of the light-receiving surface of the first element 5' is increased to a predetermined level at which the switch 23 is changed over from the "23b" position to the "23a" position where the second element 5" is disconnected from the circuit 24 and instead the first element 5' is connected thereto to operate the camera in the OTL light metering mode. When the object brightness level exceeds the lower limit of the normal light level range, the switch is changed over by the diaphragm device 37, 37' from the "23a" position to the "23b" position to operate the camera in the TTL light metering mode. It is to be understood from this example of the second embodiment that the changing-over of the light metering aspect of the camera between the TTL and OTL light metering modes can be automatically accomplished at the boundary between the normal and low light level ranges. It is to be noted that although the range boundary at which the switch 23 is operated to operate between the two positions, it other words, the diaphragm device is switched between the aperture adjusting and non-adjusting modes, may be set optionally as far as the flexibility of the design is concerned, it is important from the point of view of improving the exposure control accuracy in the low light level range that the range boundary is slightly above the lower limit of the linear dynamic range of the second light value sensing element $5''$.

Figure 7:
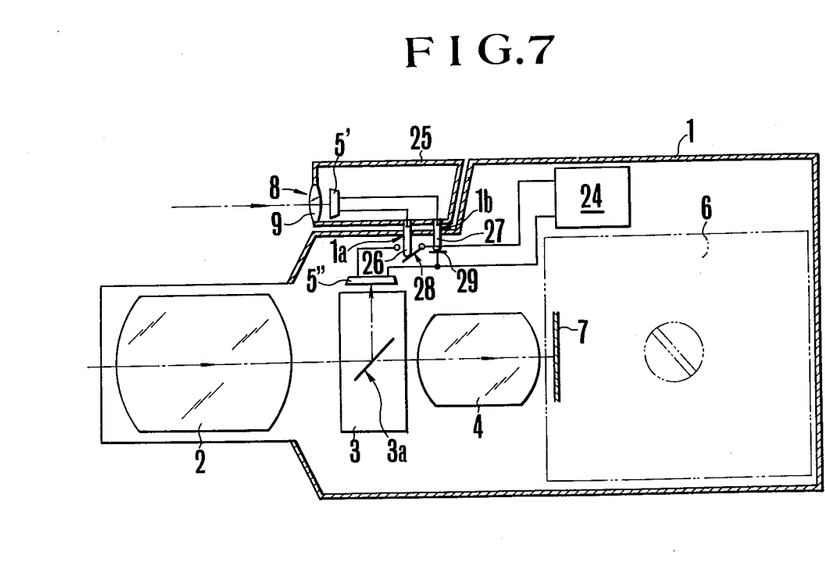
FIG. 7 shows an example of still another embodiment where the TTL and OTL light metering systems are provided in the camera body and an attachment unit removably attached thereto respectively.

FIG. 7 shows an example of still another embodiment wherein the TTL light metering system is provided in the camera body, while the OTL light metering system is provided in an attachment unit removable from the camera body. As shown in FIG. 7, the attachment unit removably mounted in a frontal recessed portion of the camera housing 1 comprises a housing 25, a light-entering window 8 formed in a portion of the unit housing 25, a light-collecting lens 9 fixedly mounted in the window 8, a first light value sensing element $5'$ positioned behind the lens 9 to pick up the light coming through the lens 9 and a pair of output terminals 26 and 27 of element $5'$ extending from the unit housing 25 through respective holes 1a and 1b provided through the camera housing 1 into the interior of the camera body, where a cut off switch 28 connected in one lead between the second element $5''$ and the light metering circuit 24 is opened in engagement at its movable contact with the terminal 26, and a branched contact 29 connected to the other lead of element $5''$ is in electrical contact with the terminal 27 of the first element $5'$, thereby the first element $5'$ is connected to the light metering circuit 24, while the second element $5''$ is disconnected therefrom. When the attachment unit is detached from the camera body, the switch 28 is closed to connect the second element $5''$ to the circuit 24. Thus, the changing-over of the light metering aspect of the camera from the TTL to the OTL light metering mode, or the vice versa, can be accomplished in automatic response to an attachment or detachment of the attachment unit to or from the camera body respectively.

The various examples of the light metering system of the invention have been described in connection with the light meter arrangement with a single common light value sensing element 5 as in FIGS. 1, 2 and 3 and with separate element $5'$ and $5''$ as in FIGS. 4, 5, 6 and 7, and the construction of the light metering mode changeover means. According to another feature of the present invention, the provision for compensating a difference between the sensitivities of the TTL and OTL light metering systems is made at additional suitable means, though not shown in the examples of FIGS. 1 through 7, or otherwise the light value sensing element, 5, $5'$ and $5''$ produce different outputs in response to an equivalent object brightness, when the light metering system is switched between the TTL and OTL light metering modes. As an example of this compensating means use may be made of a resistor arranged upon selection of the particular one of the two metering modes to be brought into connection with the light metering circuit 24. In the case of the light metering system having two light value sensing elements as in the examples of FIGS. 4 through 7, instead of using the resistor as the compensating means, it is possible to utilize the difference between the output versus illumination response characteristics of these two elements. This difference compensates the output change due to the difference between the sensitivities of the TTL and OTL light metering systems.

Figure 8:
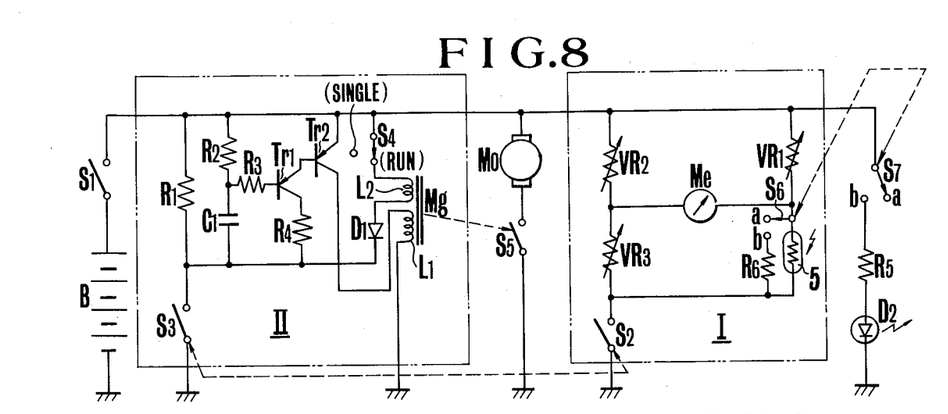
FIG. 8 shows an example of an exposure control circuit suitable for use in the camera with the light metering system of FIGS. 1, 2 and 3.
Figures 9, 10:
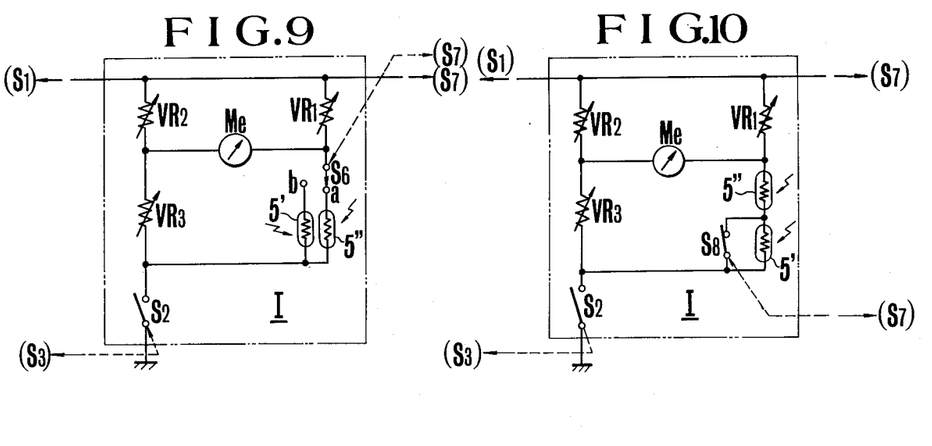
FIG. 9 shows an example of an exposure control circuit and particularly a diaphragm control circuit section I different from that of FIG. 8, suitable for use in the camera with the light metering system of FIGS. 4, 5 and 6.
FIG. 10 shows an example of an exposure control circuit and particularly a diaphragm control circuit section I different from that of FIG. 8, wherein the TTL and OTL light metering systems provided with respective light value sensing elements 5" and 5' as shown in FIGS. 4 through 7 are simultaneously rendered operative to thereby compensate the output of element 5" of the TTL light metering system by the output of element 5' of the OTL light metering system.

With reference to FIGS. 8, 9 and 10, a number of exposure control systems for a camera having the light metering system of the character described above will be exemplified below.

FIG. 8 shows an example of an exposure control circuit suitable for use in a motion picture camera having the light metering system of FIGS. 1, 2 or 3. The exposure control circuit comprises a diaphragm control circuit section I and a motor drive control circuit section II. The diaphragm control circuit I is constructed in the form of a bridge circuit having a pair of input terminals respectively connected to a positive bus connected through a power switch $S_1$ to the positive terminal of a battery B and to a negative or grounded bus through a diaphragm control circuit-actuating switch $S_2$, and a pair of output terminals between which a meter Me associated with a diaphragm drive device not shown is connected. Three variable resistors $VR_1$, $VR_2$ and $VR_3$ are provided in respective arms of the bridge circuit for setting various exposure control parameters such as shutter speed, film speed and the like. The other arm of the bridge circuit contains the light value sensing element 5 which is used in both of the TTL and OTL light metering modes. In order to compensate the fracture of the output of element 5 due to the difference between the sensitivities of the TTL and OTL light metering optical systems, there is provided a resistor $R_6$ and a cut off switch $S_6$ connected in series with each other and in parallel to element 5. The switch $S_6$ is arranged to cooperate with the light metering mode changeover means in such a manner that when the TTL or OTL light metering mode is selected, switch $S_6$ is set to its "a" or "b" position respectively. In order to indicate the selection of the OTL light metering mode, there is provided an indicating circuit comprising a light-emitting diode $D_2$, a resistor $R_5$ and a cut off switch $S_7$ connected in series with each other. The switch $S_7$ is connected with switch $S_6$. It is preferred to arrange the light emitting diode $D_2$ in the view finder of the camera so that the indication can be recognized by the photographer looking through the view finder.

The motor drive control circuit II comprises a discharge resistor $R_1$, a timing circuit containing a resistor $R_2$ and a condenser $C_1$, a first switching transistor $Tr_1$ having a base electrode connected through a resistor $R_3$ to the junction of the connection between resistor $R_2$ and condenser $C_1$, having a collector electrode connected through a resistor $R_4$ to the negative bus and having an emitter electrode connected to the base electrode of a second switching transistor $Tr_2$, a main coil $L_1$ of an electromagnet Mg of which one end is connected to the collector electrode of transistor $Tr_2$ and of which the other end is connected to the ground, and a sub-coil $L_2$ of which one end is connected through a switch $S_4$ to the positive bus and of which the other end is connected through a diode $D_1$ to the negative bus. The negative bus is connected to the ground through a switch $S_3$ which cooperates with switch $S_2$ and a shutter release button not shown in such a manner that when the shutter release button is depressed to the first stroke, switch $S_2$ is closed, and when to the second stroke, switch $S_3$ is closed. The electromagnet Mg cooperates with a control switch $S_5$ for a shutter drive motor Mo. The switch $S_4$ serves to select either the running exposure or the single frame exposure, as it is set in "RUN" or "SINGLE" position respectively.

The operation of the exposure control circuit of FIG. 8 is as follows. In order to make running exposures in the TTL light metering mode, the switch $S_4$ is set to the "RUN" position, and the light metering mode changeover means is operated to set switches $S_6$ and $S_7$ to their respective "a" positions, thereby the resistor $R_6$ for the light value compensation, and light-emitting diode $D_2$ are cut off from the circuit of FIG. 8.

When the shutter release button is depressed to the first stroke, switch $S_2$ is closed to render the bridge circuit operative, thereby the meter Me controls the size of the aperture opening for the objective lens in accordance with the output of the bridge circuit. Upon further depression of the release button to the second stroke, switch $S_3$ is closed to simultaneously energize the main and sub coils $L_1$ and $L_2$ of the electromagnet Mg, thereby the switch $S_5$ is closed to energize the winding the motor Mo. After a very short period from the closure of switch $S_3$, the voltage of condenser $C_1$ reaches a trigger voltage for the switching transistors $Tr_1$ and $Tr_2$, thereby the main coil $L_1$ is deenergized but the sub coil $L_2$ continues to be energized to preserve the full function of electromagnet Mg.

When the release button is released from the depression to terminate the running of exposures, switch $S_3$ is opened to deenergize the sub coil $L_2$, thereby switch $S_5$ is opened to stop motor Mo from rotation. The release of the release button also causes the opening of switch $S_2$ which in turn causes the diaphragm control circuit to be rendered inoperative.

In order to make running exposures in the OTL light metering mode, the changeover means is operated to set switches $S_6$ and $S_7$ to their "b" positions, thereby resistor $R_6$ is connected to the diaphragm control circuit I and the light emitting diode $D_2$ is energized from the battery B through the closed power switch $S_1$. When the shutter release button is depressed to the first stroke, switch $S_2$ is closed causing the meter Me to control operation of the diaphragm device while the output of the bridge circuit being compensated by resistor $R_6$ to cancel the difference between the sensitivities of the TTL and OTL light metering systems. Upon further depression of the shutter release button to the second stroke, the release switch $S_3$ is closed to render operative the motor drive control circuit II. The subsequent operation proceeds in a manner similar to that shown above.

In order to make a single frame exposure, switch $S_4$ is set from the "RUN" position to the "SINGLE" position to cut off the sub coil $L_2$ from the battery B, so that when the shutter release button is depressed to close switch $S_3$, only the main coil $L_1$ is energized for a very short period dependent upon the RC time constant of the timing circuit $R_2$ and $C_1$. Therefore, after switch $S_4$ is set from the "RUN" position to the "SINGLE" position, and the power switch $S_1$ is closed, when the shutter release button is depressed to close switches $S_2$ and $S_3$ successively, the diaphragm control circuit I is rendered operative and then the transistors $Tr_1$ and $Tr_2$ are rendered conducting to energize the main coil $L_1$ of electromagnet Mg which in turn causes energization of the winding of motor Mo by closure of switch $S_5$. As the motor Mo is rotated, a rotary shutter of construction known in the art is driven for rotation to unblock the exposure aperture. The charging of timing condenser $C_1$ through resistor $R_1$ to the trigger voltage for the switching transistors $Tr_1$ and $Tr_2$ is completed in a very short time period, in more detail, before one revolution of the shutter is completed, and the shutter is stopped from rotation in the aperture blocking position. When the shutter release button is released from depression, switch $S_3$ is opened to discharge the condenser $C_1$ through the resistor $R_1$ and $R_2$, thereby the motor drive control circuit II is made ready for the next single frame exposure. Thus, each time the release button is depressed, only one frame exposure is made.

FIG. 9 shows an example of arrangement of two light value sensing elements in a common exposure control circuit adapted for association with the light metering system of FIGS. 4, 5 or 6. In one arm of a bridge circuit similar to that shown in FIG. 8, there is provided first and second elements 5' and 5" in combination with a circuit transfer switch $S_6$ cooperative with the light metering mode changeover means. When switch $S_6$ is set in its "a" position, only the second element 5" is connected in the bridge circuit, while the first element 5' is cut off therefrom, thereby permitting the exposure control operation in the TTL light metering mode. When switch $S_6$ is set in its "b" position, the second element 5" is cut off from the bridge circuit, and instead the first element 5' is connected thereto, permitting the exposure control operation in the OTL light metering mode. It is now to be noted that the light response characteristics of the first and second elements 5' and 5" are so different from each other as to compensate the difference between the sensitivities of the TTL and OTL light metering systems.

FIG. 10 shows another example of arrangement of the two light value sensing elements in a common exposure control circuit suitable for use in a camera with the light metering system of FIGS. 4, 5 or 6, wherein when the camera is operated in the TTL light metering mode, the output of the second element 5" for the TTL light metering system is modified by the output of the first element 5' for the OTL light metering system, as is known in the art as the so-called "back light control". As shown in FIG. 10, the first and second elements 5' and 5" are connected in series with each other and in one arm of a bridge circuit similar in construction to that shown in FIGS. 8 or 9, and a short-circuiting switch $S_8$ is connected across the first element 5'. When switch $S_8$ is closed to short-circuit the first element 5', only the second element 5" is rendered operative for the exposure control in the TTL light metering mode. When switch $S_8$ is opened, the first and second elements 5' and 5" are simultaneously rendered operative for the exposure control in both of the TTL and the OTL light metering modes.

Figure 11:
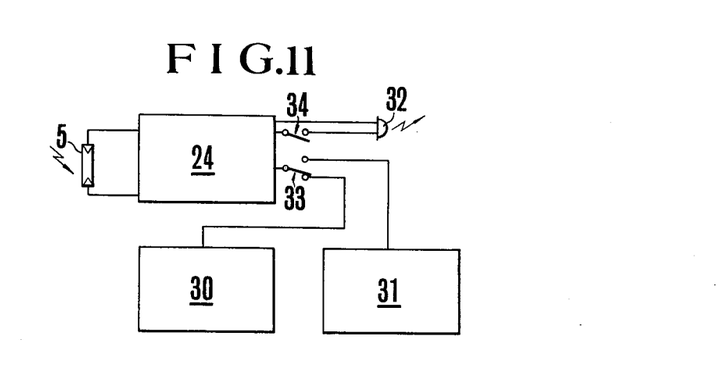
FIG. 11 shows a first example of switching arrangement adapted for use in the camera with the light metering system of FIGS. 1, 2 and 3.
Figure 12:
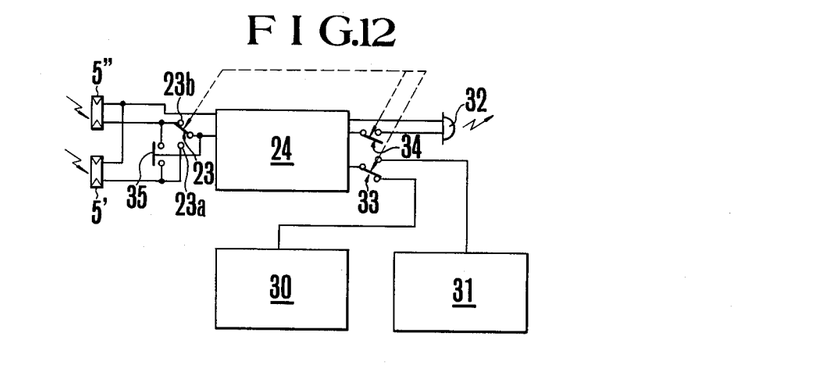
FIG. 12 shows a second example of switching arrangement adapted for use in the camera with the light metering system of FIGS. 4, 5 and 6.
Figure 13:
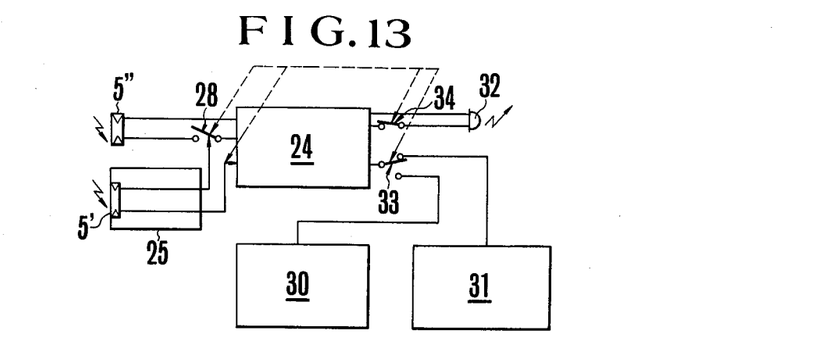
FIG. 13 shows a third example of switching arrangement adapted for use in the camera with the light metering system of FIG. 7.

With reference to FIGS. 11, 12 and 13, there is shown three examples of switching arrangement for selecting suitable combinations of the TTL and OTL light metering modes with the two exposure control modes, namely, the shutter preselection automatic exposure control mode and the diaphragm preselection automatic exposure control mode.

FIG. 11 shows an example of switching arrangement for use in a motion picture camera with the light metering system of FIGS. 1, 2 or 3. The light metering circuit 24 containing a single light value sensing element 5 is connected through a circuit transfer switch 33 either to a first exposure control circuit 30 provided with the shutter preselection automatic exposure control range, or to a second exposure control circuit 31 provided with the diaphragm preselection automatic exposure control range. The switch 33 is associated with the changeover means for changing over the light arrangement between the TTL and OTL light metering optical systems. An indicator 32 such as a light-emitting diode for indicating which light metering mode is under operation is connected to the light metering circuit 24 through a switch 34 cooperative with the switch 33. With this light metering system, it is preferred to combine the TTL light metering with the shutter preselection exposure range, and to combine the OTL light metering with the diaphragm preselection exposure range. In this case, when the light value sensed by the element 5 is within the normal range, the camera is operated in the TTL light metering mode, while controlling the size of the aperture opening in accordance with the output of the metering circuit 24 and the preselected shutter speed. On the other hand, when the light value is lower than the lower limit of the normal light level range, the camera is operated in the OTL light metering mode, while controlling the exposure time in accordance with the output of the light metering circuit 24 and the maximum aperture value.

FIG. 12 shows an example of switching arrangement for use in a motion picture camera with the light metering system of FIGS. 4, 5 or 6, wherein the first and second elements 5' and 5" are selectively or simultaneously connected to the light metering circuit 24 by means of an element transfer switch 23, or a cut-off switch 35 respectively. The element transfer switch 23 is associated with the switches 33 and 34. When the cut-off switch 35 is closed independently of the other switches, the output of the second element 5" for the TTL light metering is modified by the output of the first element 5' for the OTL light metering, as mentioned in connection with FIG. 10, thereby the so-called "back light control" is made possible.

FIG. 13 shows an example of switching arrangement for use in a motion picture camera with the light metering system of FIG. 7, wherein the switches 28, 33 and 34 are operated in automatic response to an attachment of the attachment unit to the camera body. When switch 28 is opened by the attachment unit 25, the second element 5" is cut off from the light metering circuit 24, and instead the first element 5' is connected thereto. Further, the selection of either the first or the second exposure control circuits 30 and 31 for connection to the light metering circuit 24 is controlled in a manner similar to that shown in connection with FIG. 11.

It will be seen from the foregoing description that the present invention provides a light metering system for a photographic camera which permits selection of a desired light metering mode from the TTL and OTL light metering systems to largely improve the exposure control accuracy not only in the normal light level range but in the low light level range. Further, the OTL light metering system is provided with an inherent optical system which restricts the angular field of light metering to preserve a high standard of fidelity of the light metering system. These features of the invention assist in broadening photographic capabilities particularly for low light level exposure control in dark room and at night photography applications. One of the advantages of the present invention is to accomplish the above mentioned objects of the present invention by use of very simple structure. The effectiveness of the present invention can be further improved by the suitable combinations of the TTL and OTL light metering modes with the exposure control modes as shown in connection with FIGS. 6 through 8.

The present invention has been described in connection with specific examples, all of which are applied to a motion picture camera. However, it will be appreciated that various changes can be made within the scope of the description. In addition, various types of photographic instruments besides cameras could be utilized by the invention. Hence, the invention can be practiced otherwise than as specifically described herein.

What is claimed is:

1. For a camera having a housing and an objective lens, an exposure control system, comprising optical means in the housing for passing light into the housing, light sensing means in the housing for responding to light incident thereon and for producing an output corresponding to the level of light incident thereon, electrically variable diaphragm means coupled to said sensing means and responsive to said sensing means for establishing an aperture at the objective in response to the output of said sensing means, and setting means coupled to said sensing means and said diaphragm means for setting said sensing means into a first mode in which the output of the sensing means responds only to light from the objective lens when the diaphragm opening is within a first range, and for setting said sensing means into a second mode in which the output of the sensing means responds only to light through said optical means when the size of the aperture is within a second range.

2. A light metering system for a photographic camera, said camera having a housing, a view finder and an objective lens, which system comprises;
   (a) a light-entering aperture formed in a portion of said housing,
   (b) optical means for light collection positioned in said aperture,
   (c) light value sensing means positioned to pick up either of at least a fraction of light coming through at least a portion of said objective lens and the light coming through said optical means,
   (d) changeover means operable to permit said light value sensing means to cooperate either with said portion of said objective lens, or with said optical means, thereby making it possible to selectively operate said camera in one of two different light metering modes, and
   (e) indicating means operatively connected to said changeover means for indicating which light metering mode is selected, said indicating means being positioned so that the indication can be viewed in said view finder.

3. A light metering system according to claim 2, wherein said indicating means includes;
   (a) a luminous body responsive to the supplying of electric energy for emitting light and positioned to be viewed in said view finder,
   (b) electrical energy supplying means for supplying electric energy to said luminous body, said luminous body being electrically connected to said electrical energy supplying means, and
   (c) switch means cooperative with said changeover means to connect or disconnect said luminous body with or from said electrical energy supplying means, as said changeover means is set from one light metering mode to the other.

4. A light metering system according to claim 2, wherein said light value sensing means is fixedly secured at a predetermined location within said housing, and said changeover means has second optical means capable of changing over between a first operative position permitting for said light value sensing means to pick up at least a fraction of the light coming through at least a portion of said objective lens and a second operative position permitting for said light value sensing means to pick up the light coming through said first optical means.

5. A light metering system according to claim 4, wherein said changeover means is provided with manually operating means arranged to be accessible from the outside of said housing and operatively connected to said second optical means for changing-over said second optical means between said first and second operative positions.

6. A light metering system according to claim 2, wherein said light value sensing means is arranged to be movable between a first operative position picking up at least a fraction of the light coming through at least a portion of said objective lens and a second operative position picking up the light coming through said optical means, and said changeover means is provided with manually operating means arranged to be accessible from the outside of said housing and operatively connected to said light value sensing means for moving said light value sensing means between said first and second operative positions.

7. A light metering system according to claim 2, wherein said light value sensing means is capable of producing an output in the form of an electrical signal with magnitude corresponding to the level of brightness of an object being photographed, and wherein there is further provided a signal processing circuit electrically connected to said light value sensing means for processing the output signal of said light value sensing means to provide information representative of an exposure value.

8. A light metering system according to claim 7, wherein said signal processing circuit is provided with electrical compensating means arranged upon setting of said changeover means from one light metering mode to the other to be selectively connected to said signal processing circuit for compensating a change in the output of said light value sensing means resulting from a difference in the optical conditions between said portion of said objective lens and said optical means.

9. A light metering system according to claim 8, wherein said signal processing circuit is provided with switch means cooperative with said changeover means for selectively connecting said compensating means to said signal processing circuit as said changeover means is set from one light metering mode to the other.

10. A light metering system according to claim 7, wherein said camera has diaphragm means arranged to define a substantial aperture for said objective lens, and wherein there is further provided control means responsive to the output of said processing circuit and operatively connected to said diaphragm means for controlling the size of the aperture opening of said diaphragm means to make a correct exposure.

11. A light metering system according to claim 10, said control means includes meter means.

12. A light metering system according to claim 7, in which said light value sensing means comprises;
a first light value sensing element positioned to pick up a fraction of the light coming through at least a portion of said objective lens, and
second light value sensing element positioned to pick up the light coming through said optical means, said first and second sensing elements each being able to produce an electrical signal corresponding to the brightness and being connectable selectively to said processing circuit,
said changeover means being operable to selectively connect said first and second sensing elements to said processing circuit.

13. A light metering system according to claim 12, wherein said first and second light value sensing elements have different light response characteristics from each other to such an extent as to compensate the difference in optical conditions between said objective lens and said optical system.

14. An exposure control system for a camera, said camera having a housing and an objective lens, which system comprises;
(a) a light-entering aperture formed in a portion of said housing,
(b) an optical system for light measurement positioned in said aperture,
(c) first and second light value sensing means each capable of producing an electrical output corresponding to the level of brightness of an object being photographed, said first light value sensing means being arranged to pick up at least a fraction of the light coming through at least a portion of said objective lens, and said second light value sensing means being arranged to pick up the light coming through said optical system,
(d) an output processing circuit electrically connected to either of said first and second light value sensing means for processing the output of either said first or said second light value sensing means, said output processing circuit being capable, upon response to the output of either said first or said second light value sensing means, of producing an output representative of an exposure value,
(e) diaphragm means electrically connected to said output processing circuit for defining a substantial aperture opening for said objective lens in conformance with the output of said output processing circuit,
(f) changeover means operable to selectively connect said first and second light value sensing means to said processing circuit, said changeover means having switch means arranged in the connection between said first and second light value sensing means and said output processing circuit for selecting either said first or second light value sensing means for connection to said output processing circuit said switch means is operatively associated with said diaphragm means so that when the size of the aperture opening has reached a predetermined level, the connection of said first and second light value sensing means to said output processing circuit is changed over.

15. A light metering system according to claim 14, wherein said output processing circuit is provided with electrical compensating means arranged upon setting of said changeover means from one light metering mode to the other to be selectively connected to said output processing circuit for compensating a difference between the outputs of said first and second light value sensing means due to the difference in optical conditions between said objective lens and said optical system.

16. A light metering system according to claim 15, wherein said output processing circuit is provided with switch means cooperative with said changeover means for selectively connecting said compensating means to said output processing circuit as said changeover means is set from one light metering mode to the other.

17. A light metering system according to claim 14, wherein said first and second light value sensing means have different light response characteristics from each other to such an extent as to compensate the difference in optical conditions between said objective lens and said optical system.

18. A light metering system according to claim 14, further comprising indicating means operatively connected to said changeover means for indicating which light metering mode is selected.

19. A light metering system according to claim 18, wherein said camera is provided with a view finder, and said indicating means is positioned so that the indication can be viewed in said view finder.

20. A light metering system for a camera including;
   (a) an attachment unit adapted to be attachable to and detachable from said camera, said attachment unit having;
      (1) a housing,
      (2) a light-entering aperture formed in a portion of said housing,
      (3) optical means for light collection positioned in said aperture, and
      (4) first light value sensing means arranged to pick up the light coming through said optical means and capable of producing an electrical output corresponding to the level of brightness of an object being photographed,
   (b) an objective lens system provided in said camera,
   (c) second light value sensing means arranged to pick up at least a fraction of the light coming through at least a portion of said objective lens system and capable of producing an electrical output corresponding to the level of brightness of the object,
   (d) an output processing circuit electrically connected to either of said first and second light value sensing means for processing the output of said first and second light value sensing means, and
   (e) changeover means arranged to cooperate with said attachment unit in such a manner that when said attachment unit is attached to said camera, said first light value sensing is brought into electrical connection with said processing circuit, while when said attachment unit is detached from said camera, said second light value sensing means is brought into electrical connection with said processing circuit, thereby it being made possible to operate said camera in one of two different light value metering modes.

21. A light metering system according to claim 20, wherein said changeover means is provided with switch means arranged in the connection between said second light value sensing means and said processing circuit upon detachment of said attachment unit from said camera to connect said second light value sensing means to said processing circuit.

22. A light metering system according to claim 20, wherein said output processing circuit is provided with electrical compensating means for compensating a difference between the outputs of said first and second light value sensing means due to a difference in optical condition between said optical means in said attachment unit and said objective lens system, and with switch means cooperative with said changeover means for selectively connecting said compensating to said output processing circuit, as said changeover means is set from one light metering mode to the other.

23. A light metering system according to claim 20, wherein said first and second light value sensing means have different light response characteristics from each other to such an extent as to compensate a difference in optical condition between said objective lens system and said optical means.

24. A light metering system according to claim 20, further comprising indicating means operatively connected to said changeover means for indicating which light metering mode is selected.

25. A light metering system according to claim 24, wherein said camera is provided with a view finder, and said indicating means is positioned so that the indication can be viewed in said view finder.

26. An exposure control system for a camera, said camera having a housing and an objective lens, which system includes;
   (a) a light-entering aperture formed in a portion of said housing,
   (b) optical means for light collection positioned in said aperture,
   (c) light value sensing means arranged to pick up either at least a fraction of the light coming through at least a portion of said objective lens or the light coming through said optical means, and capable of producing an output in the form of an electrical signal with magnitude corresponding to the level of brightness of an object being photographed,
   (d) a signal processing circuit electrically connected to said light value sensing means and responsive to the output signal of said light value sensing means for producing an output representative of an exposure value,
   (e) first changeover means for selecting either said objective lens or said optical means for cooperation with said light value sensing means to changeover the light metering mode from one to the other,
   (f) diaphragm means for defining the size of the substantial aperture opening for said objective lens,
   (g) first control means arranged upon electrical connection to said signal processing circuit for controlling the size of the aperture opening of said diaphragm means in accordance with the output of said signal processing circuit to make a correct exposure,
   (h) shutter means for defining the exposure time,
   (i) second control means arranged upon electrical connection to said signal processing circuit for controlling the period of actuation of said shutter means in accordance with the output of said signal processing circuit to make a correct exposure, and
   (j) second changeover means cooperative with said first changeover means for selectively connecting said first and second control means to said signal processing circuit to change over the exposure control mode from one to the other.

27. An exposure control system according to claim 26, further including indicating means operatively connected to said first changeover means for indicating which light metering mode is selected.

28. An exposure control system according to claim 27, wherein said camera is provided with a view finder, and said indicating means is positioned so that the indication can be viewed in said view finder.

29. An exposure control system according to claim 28, wherein said indicating means includes;
   (a) a luminous body responsive to the supplying of electric energy for emitting light and positioned to be viewed in said view finder,
   (b) electrical energy supply means for supplying electric energy to said luminous body, said luminous body being electrically connected to said electrical energy supplying means, and
   (c) switch means cooperative with said first changeover means to connect or disconnect said luminous body to or from said electrical energy supplying means as said first changeover means is set from one light metering mode to the other.

30. An exposure control system according to claim 26, wherein said light value sensing means is fixedly secured at a predetermined location within said housing, and said first changeover means has second optical means capable of changing over between a first operative position permitting for said light value sensing means to pick up at least a fraction of the light coming through at least a portion of said objective lens and a second operative position permitting for said light value sensing means to pick up the light coming through said first optical means.

31. An exposure control system according to claim 30, wherein said first changeover means is provided with manually operating means arranged to be accessible from the outside of said housing and operatively connected to said second optical means for changing-over said second optical means between said first and second operative positions.

32. An exposure control system according to claim 26, wherein said light value sensing means is arranged to be movable between a first operative position for picking up at least a fraction of the light coming through at least a portion of said objective lens and a second operative position for picking up the light coming through said optical means, and said first changeover means is provided with manually operating means arranged to be accessible from the outside of said housing and operatively connected to said light value sensing means for moving said light value sensing means between said first and second operative positions.

33. An exposure control system according to claim 26, wherein said signal processing circuit is provided with electrical compensating means arranged upon setting of said changeover means from one light metering mode to the other to be selectively connected to said signal processing circuit for compensating a change in the output of said light value sensing means resulting from a difference in the optical conditions between said portion of said objective lens and said optical means.

34. An exposure control system according to claim 33, wherein said signal processing circuit is provided with switch means cooperative with said first changeover means for selectively connecting said compensating means to said signal processing circuit, as said changeover means is set from one light metering mode to the other.

35. An exposure control system for a camera, said camera having a housing and an objective lens, which system includes;
   (a) a light-entering aperture formed in a portion of said housing,
   (b) optical means for light collection positioned in said aperture,
   (c) first and second light value sensing means each capable of producing an output in the form of an electrical signal corresponding to the level of brightness of an object being photographed; said first light value sensing means being arranged to pick up at least a fraction of the light coming through at least a portion of said objective lens, and said second light value sensing means being arranged to pick up the light coming through said optical means,
   (d) a signal processing circuit electrically connected to either of said first and second light value sensing means and responsive to the output signal of said first or second light value sensing means connected thereto for producing an output representative of an exposure value,
   (e) first changeover means operable to selectively connect said first and second light value sensing means to said signal processing circuit, thereby the light metering mode is changed over from one to the other,
   (f) diaphragm means for defining the size of the substantial aperture opening for said objective lens,
   (g) first control means arranged upon electrical connection to said signal processing circuit for controlling the size of the aperture opening of said diaphragm means in accordance with the output of said signal processing circuit to make a correct exposure,
   (h) shutter means for defining the exposure time,
   (i) second control means arranged upon electrical connection to said signal processing circuit for controlling the period of actuation of said shutter means in accordance with the output of said signal processing circuit to make a correct exposure, and
   (j) second changeover means cooperative with said first changeover means for selectively connecting said first and second control means to said signal processing circuit to change over the exposure control mode from one to the other.

36. An exposure control system according to claim 35, wherein said first changeover means is operatively associated with said diaphragm means so that when the size of the aperture opening has reached a predetermined level, the connection of said first and second light value sensing means to said output processing circuit is changed over.

37. An exposure control system according to claim 36, wherein said first changeover means has switch means arranged in the connection between said first and second light value sensing means and said output processing circuit for selecting either said first or second light value sensing means for connection to said output processing circuit.
said switch means being operatively associated with said diaphragm means so that when the size of the aperture opening has reached a predetermined level, the connection of said first and second light value sensing means to said output processing circuit is changed over.

38. An automatic exposure control system for a camera including;
   (a) an attachment unit adapted to be attachable to and detachable from said camera, said attachment unit having;
      (1) a housing,
      (2) a light-entering aperture formed in a portion of said housing, (3) optical means for light collection position in said aperture, and (4) first light value sensing means arranged to pick up the light coming through said optical means and capable of producing an output in the form of an electrical signal with magnitude proportional to the level of brightness of an object being photographed, (b) an objective lens system provided on said camera, (c) second light value sensing means arranged to pick up at least a fraction of the light coming through at least a portion of said objective lens system and capable of producing an output in the form of an electrical signal with magnitude proportional to the object brightness level, (d) a signal processing circuit electrically connected to either of said first and second light value sensing means and responsive to the output signal of said first or second light value sensing means connected thereto for producing an output representative of an exposure value, (e) first changeover means arranged to cooperate with said attachment unit in such a manner that when said attachment unit is attached to said camera, said first light value sensing means is brought into electrical connection with said processing circuit, while when said attachment unit is detached from said camera, said second light value sensing means is brought into electrical connection with said processing circuit, thereby the light metering mode is changed over from one to the other, (f) diaphragm means for defining the size of the substantial aperture opening for said objective lens system, (g) first control means arranged upon electrical connection to said signal processing circuit for controlling the size of the aperture opening of said diaphragm means in accordance with the output of said signal processing circuit to make a correct exposure, (h) shutter means for defining the exposure time, (i) second control means arranged upon electrical connection to said signal processing circuit for controlling the period of actuation of said shutter means in accordance with the output of said signal processing circuit to make a correct exposure, and (j) second changeover means cooperative with said first changeover means for selectively connecting said first and second control means to said signal processing circuit to change over the exposure control mode from one to the other.

39. An exposure control system for a photographic camera, said camera having a housing and an objective lens, which system comprises;

(a) a light-entering aperture formed in a portion of said housing, (b) optical means for light collection positioned in said aperture, (c) light value sensing means positioned to pick up either of at least a fraction of light coming through at least a portion of the objective lens and the light coming through said optical means, said sensing means being capable of producing an electrical output corresponding to the level of brightness of an object being photographed, (d) an output processing circuit electrically connected to said light value sensing means for processing the output of said light value sensing means and producing an output representative of an exposure, (e) diaphragm means electrically connected to said output processing circuit for defining an aperture opening for said objective lens substantially in conformance with the output of said output processing circuit, and (f) changeover means coupled with said diaphragm means and with said sensing means for rendering said light value sensing means responsive either to light from said portion of said objective lens or said optical means, and for switching the response of said light value sensing means between light from said objective lens and said optical means when the size of the aperture opening reaches a predetermined value thereby making it possible to selectively operate said camera in one of two different light metering modes.

40. An exposure control system according to claim 39, further comprising indicating means operatively connected to said changeover means for indicating which light metering mode is selected.

41. An exposure control system according to claim 40, wherein said camera is provided with a view finder, and said indicating means is positioned so that the indication can be viewed in said view finder.

42. A light metering system for a camera said camera having a housing and an objective lens, comprising:

(a) first optical means positioned along an optical axis of said objective lens for splitting off at least a fraction of a light coming through said objective lens from an object to be photographed, (b) light value sensing means arranged to pick up the light coming through said first optical means, (c) an opening for entry of external light into said housing, said opening being formed in a portion of said housing, (d) cover means able to open or close said opening, and mounted on said housing so as to be movable between a first position for closing the opening and a second position for opening the opening, (e) said cover means comprising a second optical means for introducing external light from an object into said housing through said opening while said cover means is set at its second position, (f) third optical means arranged between said first optical means and said light value sensing means; said third optical means being switchable between a first state which permits incidence of the light coming from said first optical means onto said sensing means and a second state which prevents incidence of the light coming from said first optical means onto said sensing means while causing the light coming through said opening to be incident upon said sensing means, said third optical means being operatively connected to said cover means so as to be switched from said first state to said second state when said cover means is transferred from said first position to said second position, and to be switched from said second state to said first state when the cover means is transferred from said second position to said first position, whereby different light measuring modes are possible.

43. A light metering system according to claim 42, further comprising indicating means operatively connected to said cover means for indicating which light metering mode is selected.

44. A light metering system according to claim 43, wherein said camera is provided with a view finder, and said indicating means is positioned so that the indication can be viewed in said view finder.

45. A light metering system according to claim 44, wherein said indicating means includes;
(a) a luminous body responsive to the supplying of electric energy for emitting light and positioned to be viewed in said view finder,
(b) electrical energy supplying means for supplying electric energy to said luminous body, said luminous body being electrically connected to said electrical energy supplying means, and
(c) switch means coacting with said cover means to connect or disconnect said luminous body with or from said electrical energy supplying means, as said cover means is set from one of said two positions to the other.

* * * * *